US008538030B1

(12) United States Patent
Belenko et al.

(10) Patent No.: US 8,538,030 B1
(45) Date of Patent: *Sep. 17, 2013

(54) USE OF GRAPHICS PROCESSORS AS PARALLEL MATH CO-PROCESSORS FOR PASSWORD RECOVERY

(75) Inventors: Andrey V. Belenko, Moscow (RU); Vladimir Katalov, Moscow (RU)

(73) Assignee: Elcomsoft Co., Ltd., Moscow (RU)

( * ) Notice: Subject to any disclaimer, the term of this patent is extended or adjusted under 35 U.S.C. 154(b) by 105 days.

This patent is subject to a terminal disclaimer.

(21) Appl. No.: 13/088,455

(22) Filed: Apr. 18, 2011

Related U.S. Application Data (63) Continuation of application No. 12/204,414, filed on Sep. 4, 2008, now Pat. No. 7,929,707.

(60) Provisional application No. 60/970,277, filed on Sep. 6, 2007.

(51) Int. Cl.
*H04L 9/08* (2006.01)

(52) U.S. Cl.
USPC ....................................................... 380/286

(58) Field of Classification Search
USPC ..................... 380/201, 202, 203, 204, 182
See application file for complete search history.

(56) References Cited

U.S. PATENT DOCUMENTS

| 4,870,681 | A * | 9/1989 | Sedlak ............................. 380/30 |
| 6,230,179 | B1 * | 5/2001 | Dworkin et al. .............. 708/492 |
| 6,408,075 | B1 * | 6/2002 | Ohki et al. ....................... 380/28 |
| 6,735,611 | B2 * | 5/2004 | Vanstone ....................... 708/492 |
| 7,430,293 | B2 * | 9/2008 | Elbe et al. ........................ 380/44 |
| 2003/0200435 | A1 * | 10/2003 | England et al. ............... 713/172 |
| 2006/0167915 | A1 | 7/2006 | Furlong et al. |
| 2006/0242710 | A1 | 10/2006 | Alexander |
| 2010/0058067 | A1 | 3/2010 | Schneider |

OTHER PUBLICATIONS

Debra L. Cook, Ricardo Baratto, Angelos D. Keromytis, Remotely Keyed Cryptographics Secure Remote Display Access Using (Mostly) Untrusted Hardware, 2004, in Proceedings of ICICS, LNCS 3783.

(Continued)

*Primary Examiner* — Kambiz Zand
*Assistant Examiner* — Abiy Getachew
(74) *Attorney, Agent, or Firm* — Bardmesser Law Group (57) ABSTRACT

In a computer system having a central processing unit (CPU) and a graphics processing unit (GPU), a system, method and computer program product for recovering a password used to encrypt a plaintext, including (a) generating N passwords on the CPU; (b) providing the N passwords to the GPU; (c) for each of the N passwords, calculating a transformed value from the password on the GPU, wherein the calculating is performed in parallel for all the N passwords provided to the GPU; (d) providing the N transformed values to the CPU; (e) at the CPU, testing the N transformed values for correctness; and (f) if none of the N transformed values are correct, repeating steps (a)-(e) for the next set of N passwords; (g) informing the user of a correct password.

16 Claims, 5 Drawing Sheets

(56) References Cited

OTHER PUBLICATIONS

Cook et al., "Remotely Keyed Cryptographics Secure Remote Display Access Using (Mostly) Untrusted Hardware" (date unknown).
Faster Password Recovery with Modern GPUs, presentation by Andrey Belenko (Troopers 2008 conference).
Internet forum discussion, circa 2008-2011, available at http://web.archive.org/web/20040103103934/http://gpgpu.org/history.shtml.
Fernando et al., Programming Graphics Hardware, NVIDIA Corporation, EuroGraphics (2004).
Gershon Kedem and Yuriko Ishihara, Brute Force Attack on Unix Passwords With SIMD Computer, Proceedings of the 8th USENIX Security Symposium (1999).
History of GPGPU, date unknown.

* cited by examiner

FIG. 1

Single core CPU

FIG. 2

Dual core CPU

GPU (GeForce 8800 GTX)

USE OF GRAPHICS PROCESSORS AS PARALLEL MATH CO-PROCESSORS FOR PASSWORD RECOVERY

CROSS-REFERENCE TO RELATED APPLICATIONS

This application is a continuation-in-part of U.S. patent application Ser. No. 12/204,414, filed on 4 Sep. 2008, which claims the benefit of U.S. Provisional Application for Patent No. 60/970,277 entitled USE OF GRAPHICS PROCESSORS FOR PASSWORD RECOVERY, filed on Sep. 6, 2007, which are both incorporated by reference herein in their entirety.

BACKGROUND OF THE INVENTION

1. Field of the Invention

The present invention is related to cryptography, and, more particularly, to recovery of encrypted information using a graphical processing unit of a computer as a co-processor.

2. Description of the Related Art

Password recovery, password audits, cryptographic algorithm tasks and cryptographic protocol tasks are all tasks that are extremely demanding on the computational technology. Verifying the correctness of a single password can require tens of thousands of cryptographic transformations, such as hash functions or encryptions. A typical attempt to recover a password or to conduct a password audit requires testing hundreds of millions of passwords, which is a very heavy computational burden on the computer processor.

Traditionally, all such calculations were done on the computer's central processing unit, or CPU, since the hardware and software mechanisms for implementing such operations on other elements of the computer hardware were typically absent. One exception was certain hardware/printed circuit boards, which were specialized for particular tasks (e.g., IBM 4764 PCI-X Cryptographic Coprocessor, Sun Crypto Accelerator 6000 Board, which is typically used to offload SSL processing from CPUs on servers), however, such hardware is generally rare and has not found widespread acceptance. Recently, software began appearing that would take advantage of the capabilities of the graphical processing units (GPUs) of desktop computers. Such graphical processing units are part of a desktop computer's video card. The selection of such GPUs for some of these tasks was not accidental, since working with three-dimensional graphics and rendering of images typically requires advanced computational capabilities.

Thus, just as the capability of the CPUs increases from year to year, the capabilities of the graphics processors also improve continuously from year to year, and the amount of memory available on a typical video card also increases. For example, in 2007, there were video cards available with 1.5 gigabytes of video random access memory. However, earlier approaches to the use of GPUs for some calculation intensive tasks outside of video graphics processing were unsuitable for implementing cryptographic primitives, and therefore, were unsuitable for password recovery and password audit. The problem with GPUs was that they were adapted for processing of floating point calculations, and were generally not suitable for performing integer calculations (or at least, when performing the integer calculations, the performance of a GPU was not sufficiently better than the performance of a CPU).

Such GPUs therefore could not easily work with cryptographic primitives, which require implementing integer functions and integer operations, not floating point operations.

SUMMARY OF THE INVENTION

Accordingly, the present invention is related to a system and method for using graphics processors for cryptographic attack that substantially obviates one or more of the disadvantages of the related art.

In one aspect, in a computer system having a central processing unit (CPU) and a graphics processing unit (GPU), there is provided a system, method and computer program product for recovering a password used to encrypt a plaintext, including (a) generating N passwords on the CPU; (b) providing the N passwords to the GPU; (c) for each of the N passwords, calculating a transformed value from the password on the GPU, wherein the calculating is performed in parallel for all the N passwords provided to the GPU; (d) providing the N transformed values to the CPU; (e) at the CPU, testing the N transformed values for correctness; and (f) if none of the N transformed values are correct, repeating steps (a)-(e) for the next set of N passwords; (g) informing the user of a correct password.

In another aspect, in a computer system having a central processing unit (CPU) and a graphics processing unit (GPU), a method of recovering a password used to encrypt a plaintext includes (a) generating a plurality of passwords on the CPU; (b) providing the plurality of password to the GPU; (c) for each of the plurality of passwords, calculating a hash value from the password on the GPU, wherein the calculating is performed in parallel for all the generated passwords; (d) at the CPU, testing the hash values for correctness; (e) if none of the hash values are correct, repeating steps (a)-(d) for the next set of passwords, until the correct password is found; and (f) informing the user of a correct password.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide-further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiments of the present invention, examples of which are illustrated in the accompanying drawings.

In the fall of 2006, NVidia announced the second generation of graphics processors, under the code name CUDA (compute unified device architecture). In February of 2007, NVidia issued a preliminary version of software for CUDA (version 0.8), and in June 2007, a final version (version 1.0) was released. Unlike first generation graphics processors, CUDA permits working not only with floating point numbers, but also with integer type data. Depending on the capabilities of the GPU and depending on how efficiently a particular algorithm is implemented, performing the calculations in a GPU permits an increase in speed on the order of 10-50 times. GPUs manufactured before 2007 are generally not adapted for these functions. See NVIDIA developer's site, CUDA development kits and documentation: http:**devel-oper*nvidia*com*object*cuda*html, incorporated herein by reference in its entirety. NVIDIA is not the only vendor supporting general calculations on GPU. Both ATI and S3 Graphics offer similar technologies (http://ati.amd.com/technology/streamcomputing/, http://www.s3graphics.com/en/technologies/tec_dateil.aspx?supportId=34).

In the winter of 2008 specification for OpenCL (Open Computing Language) was made publicly available. OpenCL is a framework for writing programs that run across different platforms, such as CPU, GPU and other processors. Using OpenCL it is possible to write program which will run on any GPU (for which vendor had provided OpenCL drivers). This is very different from CUDA and ATI Stream which would run on NVIDIA and ATI hardware respectively. Another general framework for using GPUs for computing is DirectCompute from Microsoft. DirectCompute is an integral part of DirectX 11 and was released with Windows 7.

Also, external GPUs can be added to a computer (in addition to the internal GPU), thereby increasing the number of processors that can process the cryptographic primitives in parallel. Current systems support up to 4 external GPUs, although there is, in theory, no limit to how many external GPUs can be connected to a computer.

A modern GPU consists of a large number of processors, and represents a massively parallel machine. For example, the number of processors in GPU of the GT200 family varies from 16 (GeForce 210) to 240 (GeForce GTX 285) and even up to 480 if we take double-chip cards into account (GeForce GTX295). The processors are combined into blocks, and each such block is referred to as a "multiprocessor." Each multiprocessor has its own set of registers, memory shared between the processors, and a cache for accelerated access to memory and to constants. By way of illustration, the umber of processors in multiprocessor is different on NVIDIA and ATI cards. New NVIDIA cards are expected to also have larger multiprocessors.

From the perspective of a software developer, a GPU is a computational device that is capable of performing identical mathematical operations in parallel, on a very large number of data streams. If the same program performs the same exact operations for different data, then a corresponding part of that program can be performed on the GPU. In effect, the GPU functions as a co-processor for the CPU.

GPUs are typically a "good fit" for implementing algorithms that are computationally intensive in terms of the number of operations required, and which generally have a relatively small amount of input data and output data.

Many cryptographic transformations and functions can be implemented quite efficiently on a GPU. In particular, algorithms that use 32-bit integer arithmetic, and which do not require a large amount of random access memory, are particularly well suited to being implemented on a graphics processor. Examples of such algorithms are hash functions MD4, MD5, RIPEMD, SHA-1, SHA-256 and related hash functions, cryptographic algorithms RC5 and RC6, and so on. Generally, algorithms that require a great deal of memory, or that require intensive reads and writes to memory, are not as well suited to be implemented on graphics processors. This is particularly true if the basic element of such an algorithm does not evenly fit into 4N bytes. Examples of such algorithms are RC4 ciphers and the MD2 hash functions. For general discussion of use of GPUs for cryptographic applications, see Remotely Keyed Cryptographics Secure Remote Display Access Using (Mostly) Untrusted Hardware, http://www.ncl.cs.columbia.edu/publications/icics2005.pdf, Secret Key Cryptography Using Graphics Cards http://www.cs.columbia.edu/~library/TR-repository/reports/reports-2004/cucs-002-04.pdf, Using Graphic Processing Unit in Block Cipher Calculations http://dspace.utlib.ee/dspace/bitstream/10062/2654/1/rosenberg_urmas.pdf, Using Modern Graphics Architectures for General-Purpose Computing: A Framework and Analysis http://www.cs.washington.edu/homes/oskin/thompson-micro2002.pdf, AES Encryption Implementation and Analysis on Commodity Graphics Processing Units https://www.cs.tcd.ie/~harrisoo/publications/AES_On_GPU.pdf, dnetc RC5-72+nvidia 8800 GTX=144 Mkeys/sec, http://episteme.arstechnica.com/eve/forums/a/tpc/f/122097561/m/766004683831, OpenSSL-GPU, http://math.ut.ee/~uraes/openssl-gpu/, http://www.gpgpu.org/.

Password recovery, particularly where a "brute force" approach is used, generally involves calculating some value (i.e., transformation of the password, often using hash functions) based on each possible password, and then testing whether that value is correct. In the general case, such a task is well suited to GPU architecture: the GPU works on multiple data streams, where each processor of the GPU performs calculations, and tests only a single password. For example, one possible algorithm for testing N passwords works as follows:

1. generate N passwords on a CPU;
2. write the generated N password into GPU memory;
3. launch N streams on the GPU;
4. get results of N transformations from GPU memory; and
5. test each of the results on the CPU.

In practice, such an algorithm will work well sometimes, but not other times. In the case where the password transformation function is relatively simple, and can be performed by the GPU at the rate of several million transformations per second (for example the 8600 GTS video card can perform approximately 75 million MD5 transformations per second), then the bottleneck of the entire algorithm becomes the copying of the data to the GPU and back to the CPU. In this case, it is clear that the algorithm above needs to be modified, in order to minimize the amount of data passed back and forth between the GPU and the CPU.

A modified algorithm for testing and passwords can be as follows:

1. write data required to check transformation result for correctness into GPU memory;
2. generate an initial password on a CPU;
3. write the initial password into GPU memory;
4. start N streams on the GPU;
5. receive the correct password from the GPU memory back to the CPU.

It should be noted that in this case, each stream on the GPU, except for the actual password transformation, needs to generate the password to be tested, and then test the results of the transformation for identity with the result in step 1 of the algorithm. This modified algorithm reduces the demand on the speed of copying of data between the CPU and the GPU to a minimum.

Despite the fact that the modified algorithm requires a fairly large number of Boolean and integer arithmetic operations on the GPU, the speed of the algorithm turns out to be considerably higher than the unmodified algorithm, because the overhead associated with copying of data between the CPU and the GPU is dramatically reduced. The greater the speed of password transformation, the greater the difference.

One factor that limits the application of the modified algorithm is the fact that it can only be used for a brute force approach, where each possible password needs to be tested sequentially, or sequentially/parallel. The first (unmodified) algorithm above is not limited to this, because any set or subset of passwords can be written to GPU memory, for example, passwords from a dictionary, or any other heuristics-based subset of all possible passwords. In general, the applicability of graphics processors to password recovery for particular software products, as well as the degree of acceleration that is possible to achieve due to performing the calculations in the GPU, are determined primarily by the cryptographic primitives that a particular product uses for password testing. The following table lists some of the exemplary products, and the applicability of the approach described herein to these products:

| Product | Algorithm | | Applicable? |
|---|---|---|---|
| Microsoft Windows | DES, MD4 | | YES |
| Microsoft Office | 97-2003 | MD5, RC4 | YES for both |
| | 2000-2003 | MD5, SHA1, DES, AES | YES |
| | 2007 | SHA1, AES | YES |
| | 2010 | SHA1, AES | YES |
| PGP | CAST, IDEA, RC2, DES, 3DES, Twofish, Blowfish, AES, MD2, MD5, RIPEMD, SHA1, SHA2, RSA, DSA, El-Gamal | | YES |
| Adobe PDF | <1.4 | MD5, RC4 | YES for both |
| | 1.4-1.8 | MD5, RC4, AES | YES for at least MD5 and RC4 |
| | >=1.8 | SHA2, AES | YES |
| ZIP | SHA1, AES | | YES |
| RAR | SHA1, AES | | YES |
| WPA, WPA2 | SHA1, MD5 | | YES |
| Open Office | SHA1 | | YES |
| Unix Crypt( ) | DES, MD5, Blowfish | | YES |
| Oracle | DES, SHA1 | | YES |
| MS SQL | SHA1 | | YES |
| Windows BitLocker | SHA2, AES | | YES |

Note that Microsoft Office versions 2000 and older, as well as Adobe Acrobat versions 1.4 and older can use cryptoproviders (CSPs) installed in the system. In that case, algorithms implemented on those cryptoproviders can be added to the list above.

Figure 5:
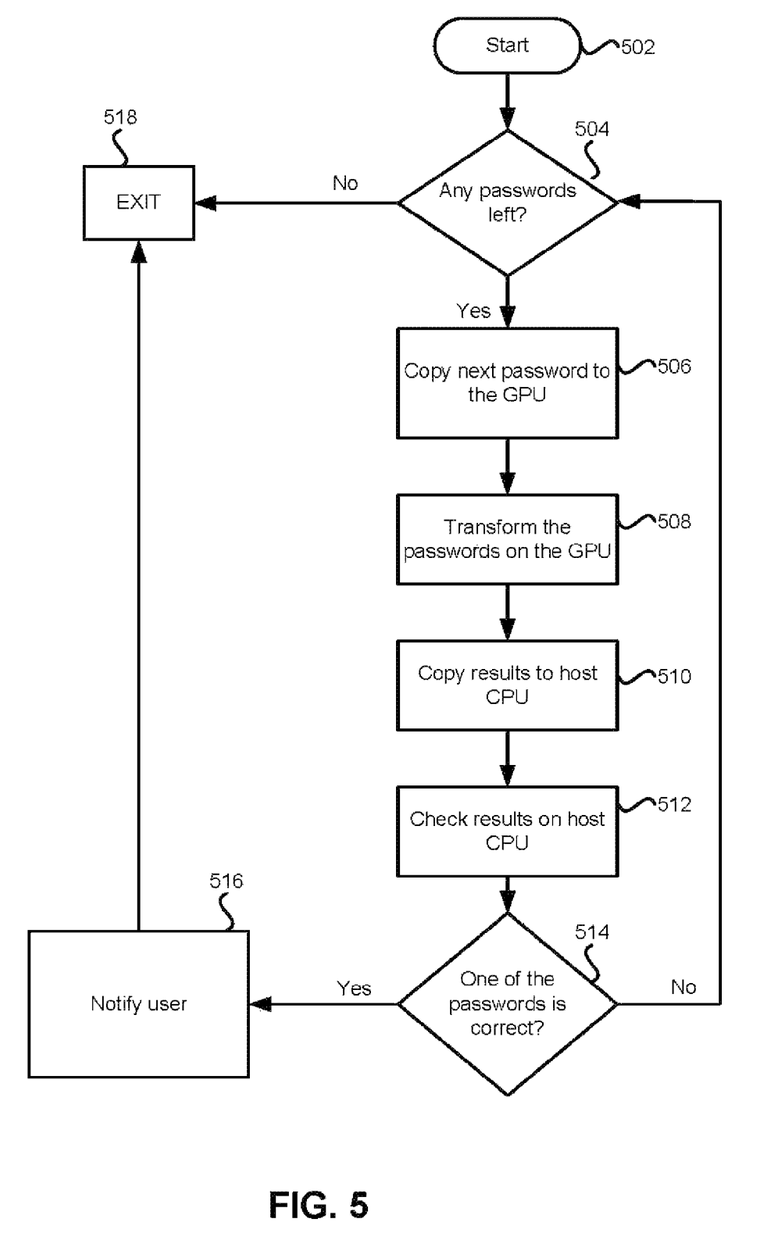
FIGS. 5-7 illustrate flow charts of exemplary embodiments of the invention.

FIG. 5 illustrates one of the exemplary algorithms discussed above. In FIG. 5, the algorithm starts at step 502. In step 504, if all the passwords have already been checked the algorithm exits at step 518. If there are still passwords left to be checked, then, in step 506, the next set of passwords is copied to the GPU. In step 508, passwords are transformed on the GPU (i.e., for example, a hash of the password is generated). In step 510, the result of the transformation is copied back to the host CPU. In step 512, the results are checked on the CPU. In step 514, if one of the passwords is correct, then user is notified, in step 516. Otherwise, the algorithm returns back to step 504.

Figure 6:
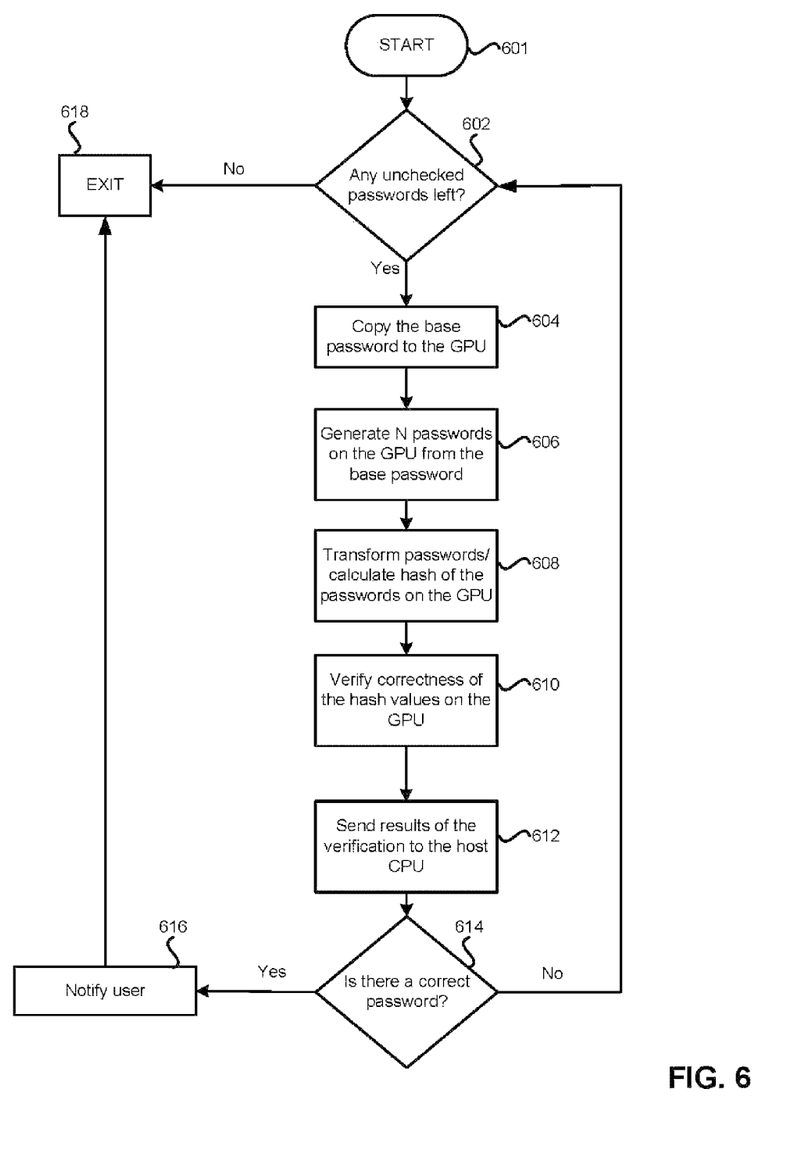

FIG. 6 illustrates another embodiment of the algorithm of the present invention. The algorithm starts in step 601. In step 602, if there are no passwords left to be checked, the algorithm exits in step 618. Otherwise, the base password is copied to the GPU, in step 604. A set of N passwords are generated on the GPU from the base password, in step 606. In step 608, the passwords are transformed, or hashes are calculated from the passwords, using the GPU. In step 610, the correctness (or incorrectness) of the hash values is verified on the GPU. In step 612, the results of the verification are sensed through the host CPU. In step 614, if there is a correct password found, then the user is notified in step 618, and the algorithm exits. Otherwise, the algorithm returns to step 602.

Generally, the above approaches can be divided into two types. The first type is the case where the passwords are generated on the CPU, then copied to the GPU. The passwords are then transformed (typically, hashed) on the GPU, the results are copied back to the CPU, and are then checked on the CPU. A second type is where the initial password is generated on the CPU, and then written to the GPU. Additional passwords are then generated on the GPU, transformed, the results are checked on the GPU, and the correct passwords, if found, is copied back to the CPU. The first approach can be utilized for virtually any type of cryptographic attack, such as brute force, mask or dictionary attack. The second approach can be applied to brute force attack and the mask attack.

Figure 7:
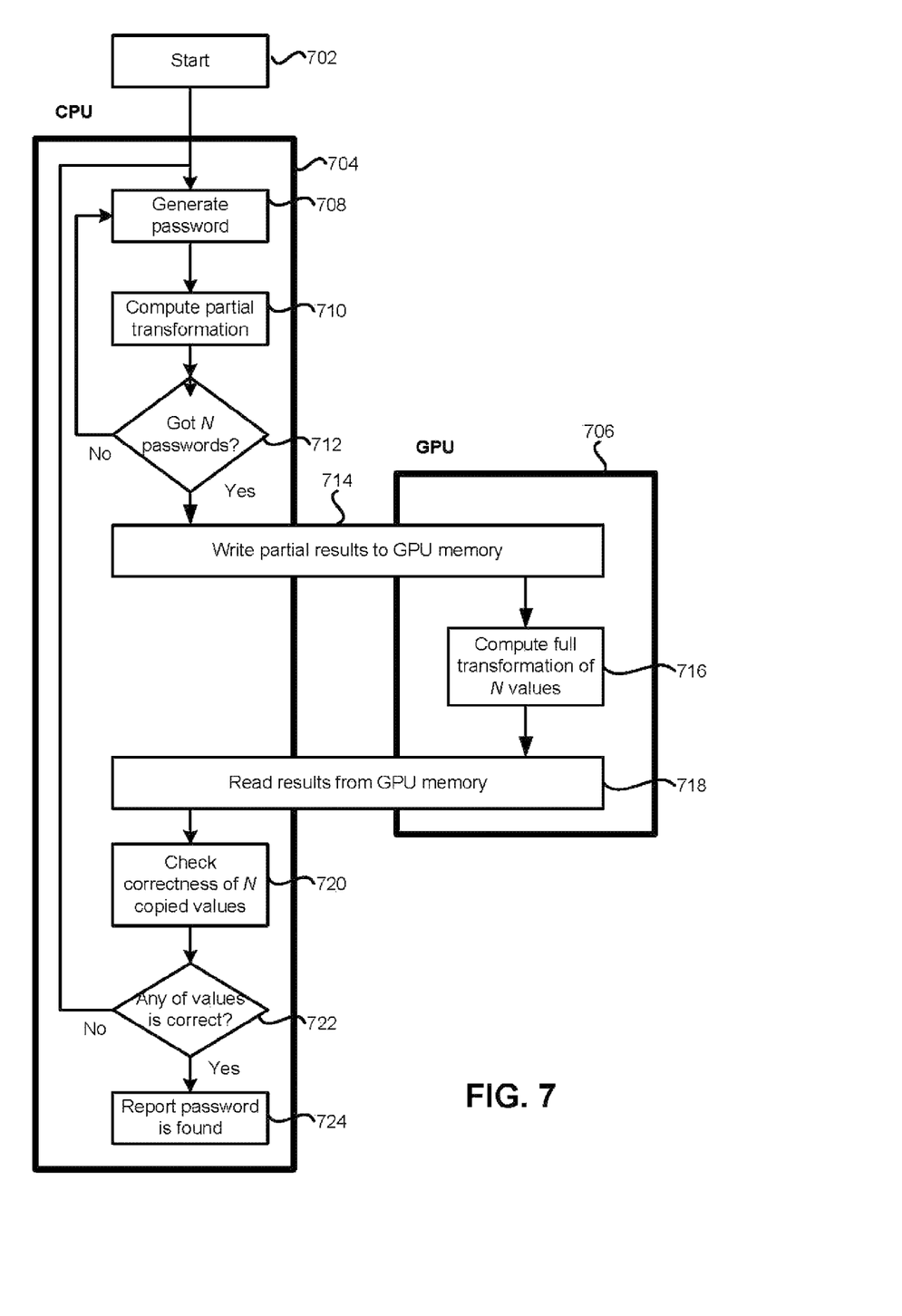

Yet another possible approach is where a "slow" password checking algorithm is used. Here, a situation can arise where no more than a few thousand passwords per second can be checked on the CPU. For example, Microsoft Office 2007, PGP, WPA and similar cryptographic products fall into this category. All of these approaches use iterative hashing, in other words, the password transformation looks as follows:

$H_0$=Hash(Password);
For i=1 To count Do
$H_i$=Hash($H_{i-1}$)
Result=$H_{count}$;

The result is then checked for correctness. In order to accelerate the cryptographic attack if a GPU is available, the first hash can be computed on the CPU. The hash is then copied to the GPU, to perform iterative hashing on the GPU, and the results are then read back to the CPU, and checked for correctness. In this case, the passwords are generated on this CPU, and there is no limitation on attack type—it can be any of a brute force, mask or dictionary, or any other. Thus, the slow iterative hash in algorithm looks as follows, see FIG. 7:

In step 702, the algorithm begins. In step 708, a password is generated on the CPU 704. In step 710, partial transformation is calculated. In step 712, the algorithm checks if N passwords have been generated. If not, more passwords are generated, and more transformations are completed. In step 714, the partial results are written to the GPU memory. In step 716, on the GPU 706, full transformation of N passwords is performed. In step 719, the results are transferred back to the CPU 704, from the GPU 706. The CPU then checks for correctness of any of the N passwords, in step 720. In step 722, if none of the values are correct, the algorithm returns to step 708. Otherwise, in step 724, the correct password is reported to the user.

In this case, the GPU is acting as a math coprocessor for generating iterative hashes, and can overlap its operations with the CPU, so that there is almost no performance penalty for partially computing the hashes on the CPU 704.

An exemplary implementation for MD5 hash brute force password attack is shown below:

```c
#include <stdio.h>
#include <windows.h>
#include <cuda_runtime_api.h>
extern "C" void runKernel( int nGrid[3], int nThreads[3], void *pdOut );
extern "C" unsigned short       d_aCharset[256];
extern "C" unsigned int         d_nCharsetLen;
extern "C" unsigned int         d_nPasswordInd[32];
extern "C" unsigned int         d_nPasswordLen;
extern "C" uint4                d_CorrectHash;
#define NUM_PASSWORDS           1048576
int main(int argc, char* argv[ ])
{
  int deviceCount = 0;
  cudaError rc;
  rc = cudaGetDeviceCount( &deviceCount );
  if( rc != cudaSuccess )
  {
    printf( " ! cudaGetDeviceCount( ) failed: %s\n",
    cudaGetErrorString( rc ) );
    return 0;
  }
  printf( " + Number of CUDA devices present: %d\n", deviceCount );
  WCHAR *pData = new WCHAR[ NUM_PASSWORDS * 8 ];
  memset( pData, 0, NUM_PASSWORDS * 16 );
  void *pdData = NULL;
  rc = cudaMalloc( &pdData, NUM_PASSWORDS * 16 );
  if( rc != cudaSuccess )
  {
    printf( " ! cudaMalloc(&pdData) failed: %s\n",
    cudaGetErrorString( rc ) );
    delete[ ] pData;
    return 0;
  }
  WCHAR wCharset[ ] = L"ABCDEFGHIJKLMNOPQRSTUVWXYZ";
  unsigned int nCharsetLen = wcslen( wCharset );
  unsigned int nPwdInd[32] = { 0 };
  unsigned int nPwdLen = 6;
  rc = cudaMemcpyToSymbol( "d_aCharset", wCharset,
  nCharsetLen*2 );
  if( rc != cudaSuccess )
  {
    printf( " ! cudaMemcpyToSymbol( ) failed: %s\n",
    cudaGetErrorString( rc) );
    delete[ ] pData;
    cudaFree( pdData );
    return 0;
  }
  rc = cudaMemcpyToSymbol( "d_nCharsetLen", &nCharsetLen, 4 );
  if( rc !=cudaSuccess )
  {
    printf( " ! cudaMemcpyToSymbol( ) failed: %s\n",
    cudaGetErrorString( rc) );
    delete[ ] pData;
    cudaFree( pdData );
    return 0;
  }
  rc = cudaMemcpyToSymbol( "d_nPasswordInd", nPwdInd, 32*4 );
  if( rc != cudaSuccess )
  {
    printf( " ! cudaMemcpyToSymbol( ) failed: %s\n",
    cudaGetErrorString( rc) );
    delete[ ] pData;
    cudaFree( pdData );
    return 0;
  }
  rc = cudaMemcpyToSymbol( "d_nPasswordLen", &nPwdLen, 4 );
  if( rc != cudaSuccess )
  {
    printf( " ! cudaMemcpyToSymbol( ) failed: %s\n",
    cudaGetErrorString( rc) );
    delete[ ] pData;
    cudaFree( pdData );
    return 0;
  }
  // Put here MD5 hash of password you want to recover
  BYTE bCorrectHash[16] = { 0x19, 0x0c, 0x27, 0xfd,
```

-continued

```c
  0x35, 0x1d, 0xef, 0xfa, 0x5c, 0xe3, 0x8b, 0x4d, 0x7b,
  0x6d, 0xc4, 0x47 };
  rc = cudaMemcpyToSymbol( "d_CorrectHash", bCorrectHash, 16 );
  if( rc != cudaSuccess )
  {
    printf( " ! cudaMemcpyToSymbol( ) failed: %s\n",
    cudaGetErrorString( rc) );
    delete[ ] pData;
    cudaFree( pdData );
    return 0;
  }
  int nGrid[3] = { 1024, 256, 1 };
  int nThreads[3] = { 24, 16, 1 };
  int nNumThreads = nGrid[0] * nGrid[1] * nGrid[2] * nThreads[0]
  * nThreads[1] * nThreads[2];
  printf( " + Executing kernel...\n" );
  WCHAR strCurPwd[16] = { 0 };
  WCHAR strResult[32] = { 0 };
  while( 1 )
  {
    for( int i = 0; i < nPwdLen; i++)
      strCurPwd[i] = wCharset[ nPwdInd[i] ];
    printf( "Current password: %S\n", strCurPwd );
    runKernel( nGrid, nThreads, pdData );
    Sleep( 2000 );
    rc = cudaThreadSynchronize( );
    if( rc != cudaSuccess )
    {
      printf( " ! Kernel execution failed: %s\n",
      cudaGetErrorString( rc ) );
      delete[ ] pData;
      cudaFree( pdData );
      return 0;
    }
    rc = cudaMemcpy( strResult, pdData, 64,
    cudaMemcpyDeviceToHost );
    if( rc != cudaSuccess )
    {
      printf( " ! cudaMemcpy( ) (H<-D) failed: %s\n",
      cudaGetErrorString( rc ) );
      delete[ ] pData;
      cudaFree( pdData );
      return 0;
    }
    cudaMemset( pdData, 0, 64 );
    if( strResult[0] != 0 )
    {
      printf( " + Password found: %S\n", strResult );
      break;
    }
    // Update nPwdInd
    unsigned int nCarry = nNumThreads;
    unsigned int nTmp;
    for( int i = 0; i <nPwdLen; i++)
    {
      nTmp = ( nPwdInd[i] + nCarry ) % nCharsetLen;
      nCarry = ( nPwdInd[i] + nCarry ) / nCharsetLen;
      nPwdInd[i] = nTmp;
    };
    // Store nPwdInd
    rc = cudaMemcpyToSymbol( "d_nPasswordInd",
    nPwdInd, 32*4 );
    if( rc != cudaSuccess )
    {
      printf( " ! cudaMemcpyToSymbol( ) failed: %s\n",
      cudaGetErrorString( rc ) );
      delete[ ] pData;
      cudaFree( pdData );
      return 0;
    }
    if( rc != cudaSuccess )
    {
      printf( " ! Kernel launch failure: %s\n",
      cudaGetErrorString( rc ) );
      delete[ ] pData;
      cudaFree( pdData );
      return 0;
    }
    // Read results
    rc = cudaMemcpy( pData, pdData, 16 * NUM_PASSWORDS,
```

```
        cudaMemcpyDeviceToHost );
    if( rc != cudaSuccess )
    {
        printf( " ! cudaMemcpy( ) (H<-D) failed: %s\n",
            cudaGetErrorString( rc ) );
        delete[ ] pData;
        cudaFree( pdData );
        return 0;
    }
    printf( " + Kernel successfully executed\n" );
    for( int i = 0; i < nNumThreads; i++ )
    {
        BYTE *pHash = (BYTE*)pData + 16*i;
    }
    delete[ ] pData;
    cudaFree( pdData );
    return 0;
}
```

Below is an example of code that runs on a GPU and implements password checking (as described in "Modified Algorithm" above). This code can be compiled with NVIDIA compiler:

```
_constant_ unsigned short d_aCharset[256];
_constant_ unsigned int d_nCharsetLen;
_constant_ unsigned int      d_nPasswordInd[32];
_constant_ unsigned int      d_nPasswordLen;
_constant_ uint4             d_CorrectHash;
_device_ void md5_transform( void *pData, uint4& hash ); _global_ void
md5pass_kernel( void* pdOut );
extern "C" void runKernel( int nGrid[3], int nThreads[3], void *pdOut ) {
    dim3 grid( nGrid[0], nGrid[1], nGrid[2] );
    dim3 threads( nThreads[0], nThreads[1], nThreads[2] );
    md5pass_kernel<<<grid, threads>>>( pdOut ); }
_global_ void md5pass_kernel( void* pdOut ) {
    int threadId = threadIdx.x + threadIdx.y * blockDim.x;
    int tid = (blockIdx.x + blockIdx.y * gridDim.x) * (blockDim.x *
blockDim.y) + threadId;
    unsigned short aPwd[32] = { 0 };
    uint4 hash;
    int i = 0;
    unsigned int nCarry = tid;
    for( i = 0; i < d_nPasswordLen; i++ )
    {
        unsigned int nTmp;
        nTmp = ( d_nPasswordInd[i] + nCarry ) % d_nCharsetLen;
        nCarry = ( d_nPasswordInd[i] + nCarry ) / d_nCharsetLen;
        aPwd[i] = d_aCharset[ nTmp ];
    };
    if( nCarry > 0 )
    {
        // this means password length should be increased
        return;
    }
    // message padding
    aPwd[ i ] = 0x80;
    // message length
    aPwd[28] = d_nPasswordLen * 16;
    md5_transform( (void*)aPwd, hash );
    if( (hash.x == d_CorrectHash.x) &&
        (hash.y == d_CorrectHash.y) &&
        (hash.z == d_CorrectHash.z) &&
        (hash.w == d_CorrectHash.w) )
    {
        //unsigned short *pOut = (unsigned short*)pdOut + tid * 8;
        unsigned short *pOut = (unsigned short*)pdOut;
        for( i = 0; i < d_nPasswordLen; i++ )
            pOut[i] = aPwd[i];
    }
}
#define F(b,c,d)        ((((c) ) & (b)) ^ d))
#define G(b,c,d)        ((((b) ^ (c)) & (d)) ^ (c))
#define H(b,c,d)        ((b) ^ (c) ^ (d))
#define I(b,c,d)        ((((~(d)) | (b)) ^ (c))
#define ROTATE(a,n)     (((a)<<(n)) | ((a)>>(32-(n))))
#define R0(a,b,c,d,k,s,t) { \
    a+=((k)+(t)+F((b),(c),(d))); \
    a=ROTATE(a,s); \
    a+=b; };\
#define R1(a,b,c,d,k,s,t) { \
    a+=((k)+(t)+G((b),(c),(d))); \
    a=ROTATE(a,s); \
    a+=b; };
#define R2(a,b,c,d,k,s,t) { \
    a+=((k)+(t)+H((b),(c),(d))); \
    a=ROTATE(a,s); \
    a+=b; };
#define R3(a,b,c,d,k,s,t) { \
    a+=((k)+(t)+I((b),(c),(d))); \
    a=ROTATE(a,s); \
    a+=b; };
_device_ void md5_transform( void *pData, uint4& hash ) {
    // MD5 chaining variables
    uint4 state = { 0x67452301, 0xefcdab89, 0x98badcfe, 0x10325476 };
    uint4 init = state;
    uint4 data[4];
    data[0] = *( (uint4*)pData );
    data[1] = *( (uint4*)pData + 1);
    data[2] = *( (uint4*)pData + 2);
    data[3] = *( (uint4*)pData + 3);
    // Round 0
    R0(state.x,state.y,state.z,state.w,data[0].x, 7,0xd76aa478L);
    R0(state.w,state.x,state.y,state.z,data[0].y,12,0xe8c7b756L);
    R0(state.z,state.w,state.x,state.y,data[0].z,17,0x242070dbL);
    R0(state.y,state.z,state.w,state.x,data[0].w,22,0xc1bdceeeL);
    R0(state.x,state.y,state.z,state.w,data[1].x, 7,0xf57c0fafL);
    R0(state.w,state.x,state.y,state.z,data[1].y,12,0x4787c62aL);
    R0(state.z,state.w,state.x,state.y,data[1].z,17,0xa8304613L);
    R0(state.y,state.z,state.w,state.x,data[1].w,22,0xfd469501L);
    R0(state.x,state.y,state.z,state.w,data[2].x, 7,0x698098d8L);
    R0(state.w,state.x,state.y,state.z,data[2].y,12,0x8b44f7afL);
    R0(state.z,state.w,state.x,state.y,data[2].z,17,0xffff5bb1L);
    R0(state.y,state.z,state.w,state.x,data[2].w,22,0x895cd7beL);
    R0(state.x,state.y,state.z,state.w,data[3].x, 7,0x6b901122L);
    R0(state.w,state.x,state.y,state.z,data[3].y,12,0xfd987193L);
    R0(state.z,state.w,state.x,state.y,data[3].z,17,0xa679438eL);
    R0(state.y,state.z,state.w,state.x,data[3].w,22,0x49b40821L);
    // Round 1
    R1(state.x,state.y,state.z,state.w,data[0].y, 5,0xf61e2562L);
    R1(state.w,state.x,state.y,state.z,data[1].z, 9,0xc040b340L);
    R1(state.z,state.w,state.x,state.y,data[2].w,14,0x265e5a51L);
    R1(state.y,state.z,state.w,state.x,data[0].x,20,0xe9b6c7aaL);
    R1(state.x,state.y,state.z,state.w,data[1].y, 5,0xd62f105dL);
    R1(state.w,state.x,state.y,state.z,data[2].z, 9,0x02441453L);
    R1(state.z,state.w,state.x,state.y,data[3].w,14,0xd8a1e681L);
    R1(state.y,state.z,state.w,state.x,data[1].x,20,0xe7d3fbc8L);
    R1(state.x,state.y,state.z,state.w,data[2].y, 5,0x21e1cde6L);
    R1(state.w,state.x,state.y,state.z,data[3].z, 9,0xc33707d6L);
    R1(state.z,state.w,state.x,state.y,data[0].w,14,0xf4d50d87L);
    R1(state.y,state.z,state.w,state.x,data[2].x,20,0x455a14edL);
    R1(state.x,state.y,state.z,state.w,data[3].y, 5,0xa9e3e905L);
    R1(state.w,state.x,state.y,state.z,data[0].z, 9,0xfcefa3f8L);
    R1(state.z,state.w,state.x,state.y,data[1].w,14,0x676f02d9L);
    R1(state.y,state.z,state.w,state.x,data[3].x,20,0x8d2a4c8aL);
    // Round 2
    R2(state.x,state.y,state.z,state.w,data[1].y, 4,0xfffa3942L);
    R2(state.w,state.x,state.y,state.z,data[2].x,11,0x8771f681L);
    R2(state.z,state.w,state.x,state.y,data[2].z,16,0x6d9d6122L);
    R2(state.y,state.z,state.w,state.x,data[3].z,23,0xfde5380cL);
    R2(state.x,state.y,state.z,state.w,data[0].y, 4,0xa4beea44L);
    R2(state.w,state.x,state.y,state.z,data[1].z,11,0x4bdecfa9L);
    R2(state.z,state.w,state.x,state.y,data[1].w,16,0xf6bb4b60L);
    R2(state.y,state.z,state.w,state.x,data[2].z,23,0xbebfbc70L);
    R2(state.x,state.y,state.z,state.w,data[3].y, 4,0x289b7ec6L);
    R2(state.w,state.x,state.y,state.z,data[0].x,11,0xeaa127faL);
    R2(state.z,state.w,state.x,state.y,data[0].w,16,0xd4ef3085L);
    R2(state.y,state.z,state.w,state.x,data[1].z,23,0x04881d05L);
    R2(state.x,state.y,state.z,state.w,data[2].y, 4,0xd9d4d039L);
    R2(state.w,state.x,state.y,state.z,data[3].x,11,0xe6db99e5L);
    R2(state.z,state.w,state.x,state.y,data[3].w,16,0x1fa27cf8L);
    R2(state.y,state.z,state.w,state.x,data[0].z,23,0xc4ac5665L);
    // Round 3
    R3(state.x,state.y,state.z,state.w,data[0].x, 6,0xf4292244L);
    R3(state.w,state.x,state.y,state.z,data[1].w,10,0x432aff97L);
```

-continued

```
    R3(state.z,state.w,state.x,state.y,data[3].z,15,0xab9423a7L);
    R3(state.y,state.z,state.w,state.x,data[1].y,21,0xfc93a039L);
    R3(state.x,state.y,state.z,state.w,data[3].x, 6,0x655b59c3L);
    R3(state.w,state.x,state.y,state.z,data[0].w,10,0x8f0ccc92L);
    R3(state.z,state.w,state.x,state.y,data[2].z,15,0xffeff47dL);
    R3(state.y,state.z,state.w,state.x,data[0].y,21,0x85845dd1L);
    R3(state.x,state.y,state.z,state.w,data[2].x, 6,0x6fa87e4fL);
    R3(state.w,state.x,state.y,state.z,data[3].w,10,0xfe2ce6e0L);
    R3(state.z,state.w,state.x,state.y,data[1].z,15,0xa3014314L);
    R3(state.y,state.z,state.w,state.x,data[3].y,21,0x4e0811a1L);
    R3(state.x,state.y,state.z,state.w,data[1].x, 6,0xf7537e82L);
    R3(state.w,state.x,state.y,state.z,data[2].w,10,0xbd3af235L);
    R3(state.z,state.w,state.x,state.y,data[0].z,15,0x2ad7d2bbL);
    R3(state.y,state.z,state.w,state.x,data[2].y,21,0xeb86d391L);
    state.x += init.x;
    state.y += init.y;
    state.z += init.z;
    state.w += init.w;
    hash = state;
}
```

[1] As described above, generally, there are two major variations on the accelerated password recovery process using a GPU—in the first one, the stream of passwords is generated on the CPU, and is fed, in "bunches" to the GPU; in the second version, only an initial password or some seed is generated on the CPU, is fed into the GPU, and then subsequent passwords are generated on the GPU.

Thus, the optimization of the process may be framed as a problem of distribution of tasks between the CPU and the GPU, that is in some sense more optimal than the two versions described above. In some cases, the incremental password may be generated on the CPU, and in some cases they may be generated on the GPU. In general, the first option is more appropriate for slow algorithms, and the second option is more appropriate for fast algorithms. This can be followed as follows:

Password recovery is generally a process of repeating the following steps:

1. Generate candidate password to be checked. Most common ways to generate candidate passwords are wordlist-based generators and brute force. A wordlist-based generator reads passwords from a user-specified wordlist file and optionally applies transformations (word mangling rules) before passing password to the next step.

A brute force generator iterates over the password space, satisfying user-specified constraints (which are, e.g., allowed password lengths and allowed characters for each position). Note that a so-called Mask attack is a special case of more general brute force attack.

2. Check the password:

2a. Compute digest of password. The exact algorithm for computing such digest varies from application to application. The algorithm might be as simple as computing an MD5 hash of a password, or it might be a complex function requiring computation of multiple hash values. One example of complex function is PBKDF2 (Password-based key derivation function) as specified in PKCS #5, which computes a digest of a password using pseudo-random functions based on cryptographic hash functions.

2b. Verify computed digest. This might be as simple as comparing computed digest against a known digest for correct password (a good example here are passwords for Windows and most Linux user accounts):

those OSes store a digest of a correct password in a user database and the password recovery goal is to find passwords matching those known digests) or it might involve more complex and time-consuming operations, such as decrypting data using the computed digest as a decryption key and then checking if decrypted data is correct.

The time spent in steps 1, 2a, and 2b can vary greatly depending on particular password protection algorithm and attack type being used.

Depending on the relative time complexity of steps 1, 2a, and 2b, and taking into consideration architectural constraints of GPUs, one can use different approaches for offloading computations to GPU.

Offloading step 1 (password generation) to the GPU normally makes sense only if the time complexity of steps 2a and 2b combined is not considerably larger than that of step 1 and if it is practical to implement it on GPU.

Otherwise the benefit of offloading password generation to the GPU will be (according to Amdahl's Law) marginal at best. In practice, it might even have a negative effect, because offloaded password generation will consume valuable resources of the GPU instead of dedicating them to steps 2a and 2b. This is especially true for wordlist-based password generators.

Similarly, offloading step 2b to GPU makes sense only if its time complexity is not considerably smaller than that of steps 1 and 2a combined, and if it is practical to implement it on GPU.

One important aspect of computing on GPUs is overlapped computations.

That is, the CPU and GPU run different steps of the process at the same time. For example, while the GPU is busy computing the digest (step 2a) for the i-th password, the CPU verifies digest (step 2b) for (i-1)-th (previous) password and generates (step 1) (i+1)-th (next) password. This allows to reduce time complexity of checking password from $O(1)+O(2a)+O(2b)$ to $Max(O(2a), O(1)+O(2b))$ where $O(x)$ is time complexity of step x.

[2] Option 2 which is somewhat similar to what is described above as it relates to the distribution of the computational load between the CPU and the GPU, in the case where part of the algorithm matches the GPU capabilities while another part of the algorithm does not. In this case, there is no point in implementing the entire verification algorithm on the GPU, since it would be less than optimally effective. In this case, part of the algorithm should be performed on the CPU, and part of the algorithm should be performed on the GPU.

There are some algorithms where steps 2a and 2b have comparable time complexities, but it is not practical to offload both of them to GPU.

One particular example is password protection of OpenOffice documents, where step 2a is variation of PBKDF2 and runs efficiently on the GPU, while step 2b requires decryption of variable amount of data using a Blowfish block cipher, which is not very efficient on GPU. The solution to this problem is to employ overlapped computing with GPU doing step 2a and all CPU cores doing step 2b cooperatively.

[3] Multiple GPUs can be installed in a system (such as, e.g., multiple graphics cards). When present, multiple GPUs can used independent of each other and thus performance is linear with the number of GPUs (with respect to their performance). That is, two identical GPUs installed in one system should provide twice the performance of single one.

Because each GPU is treated independently, there usually is no need to adjust the GPU-enabled password recovery algorithms described above for multi-GPU environments.

[4] As yet another option, the problem can be distributed to multiple nodes connected by a network, where every node is one or more GPUs. Unlike the earlier example, here, multiple clients can be connected by a local network or the Internet, and each client/node can have one of several GPUs.

[5] As yet another option, the problem of accelerated password recovery can be dealt with in an inhomogenous environment, such as one that includes a CPU, one or more GPUs and specialized accelerators. In this case, some or all of the nodes in the distributed system, can have multiple CPUs, or a multi-core CPU or several multi-core CPUs, a GPU or several GPUs, and some hardware acceleration mechanism. On such a node, a supervisor is active, which inventories of the available resources, measures their speed and throughput ability, and therefore determines which resource should be allocated how many passwords for verification (presumably, passwords that are ready to be verified at that point). The supervisor can generate them by itself, can request them from a server, or can instruct the particular resources—CPU, GPU, accelerator, etc. to generate the passwords based on initial seeds, and how many each one should generate.

[6] The above examples address primarily the brute force method, where all passwords in a given range are checked, as well as a dictionary attached. Other methods exist, that are particularly applicable to slow algorithms (and all passwords are, for some reason, impossible to verify), but the word does not exist in a dictionary.

For example:

A mask, of the type "One, three to five, one of the punctuation symbols, ending with three digits."

A word from a dictionary with several digits appended at the end.

An altered word from a dictionary, for example, adjacent letters are exchanged, or the letter "O" is replaced by a "0", or the letter F replaced with a dollar sign, or the letter "L" (lowercase 1 uppercase, replaced with a "1" or lowercase i).

[7] GPU's process work in batches and one practical aspect of using them is to deduce optimal batch size, that is, a batch size saturating the GPU's execution units and thus providing the best performance. For this application, batch size is usually expressed in number of passwords being submitted to the GPU for processing. Optimal batch size is hardware- and algorithm-dependent. It is usually not known at compile time which hardware the program will run on, so batch size should preferably be computed at run time by querying system for hardware characteristics (such as the number of processors current GPU is equipped with) and basing batch size on that.

[8] Selection of the appropriate parameters (for example, the number of streams for passwords) depending on the particular video card and GPU model, can also be optimized.

Another practical obstacle with GPUs is that some of them are not able to refresh the attached display(s) while doing computations. For the user, this means that the display 'freezes' for a noticeable amount of time and user experience becomes less comfortable. The solution to the problem is to partition task into smaller subtasks. This might seem as a direct opposite of the requirement to saturate GPU processors with optimal batch size, but it is actually not. While GPU saturation requirement dictates the number of tasks submitted to GPU at once, it does not say anything about complexity of that task. For example, consider that the task is to iteratively compute one million iterations of some function, and that optimal batch size is 100 such tasks. We can split computation of each task into, say, 1000 subtasks each computing 1000 iterations. So instead submitting 100 tasks at once, we will submit 100 subtasks 1000 times. This will still keep GPU fairly saturated (because batch size is not changed from optimal) and it will give GPU chance to redraw display after each subtask is complete (i.e. display will be updated 1000 times during the overall task computation, as opposed to no update at all with a single task approach).

[9] Solving the problem of GPU overheating and slow redrawing of the screen (i.e., reducing the load on the GPU). Generally, the password algorithms described above, such as MD4, MD5, SHA-1, etc. are often modified from their "pure form". Typically, a function derived from these hashing algorithms is often used, such as for example, PBKDF2: http://en.wikipedia.org/wiki/PBKDF2

Other functions, not just PBKDF2 can be used, the general idea being to slow down the verification of the correctness of the password, and to make the brute force approach less effective. The approach described herein is equally applicable to such schemes as well.

[10] The approach described herein is also applicable to other types of processors, such as hybrid CPU plus GPU processors (where essentially the GPU is integrated into the same chip as the CPU. Examples of this are Intel's Sandy Bridge and AMD 10LLANO processors. The concepts described above, regarding the use of the GPU for offloading some of the password verifications that can be equally applicable to those processors and hybrid systems as well. Other examples where the concepts described herein can be applied include Intel's Larrabee processor (and similar architectures), NVidia Tesla (and similar architectures), and generally many PCI/PCIe-based, or similar, external multi-core processors.

Figure 1:
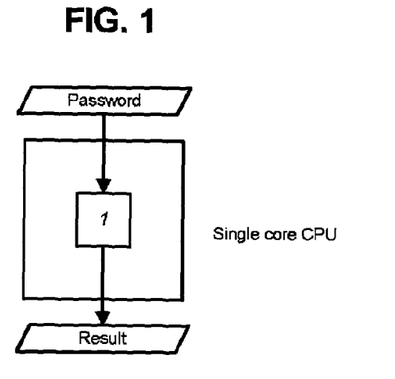
FIG. 1 illustrates a conventional brute force password verification.
Figure 2:
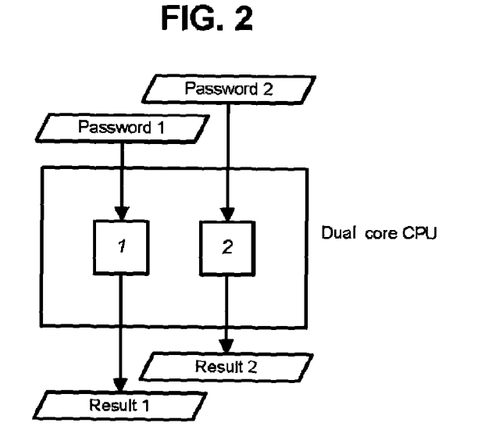
FIG. 2 illustrates a dual core brute force password verification.
Figure 3:
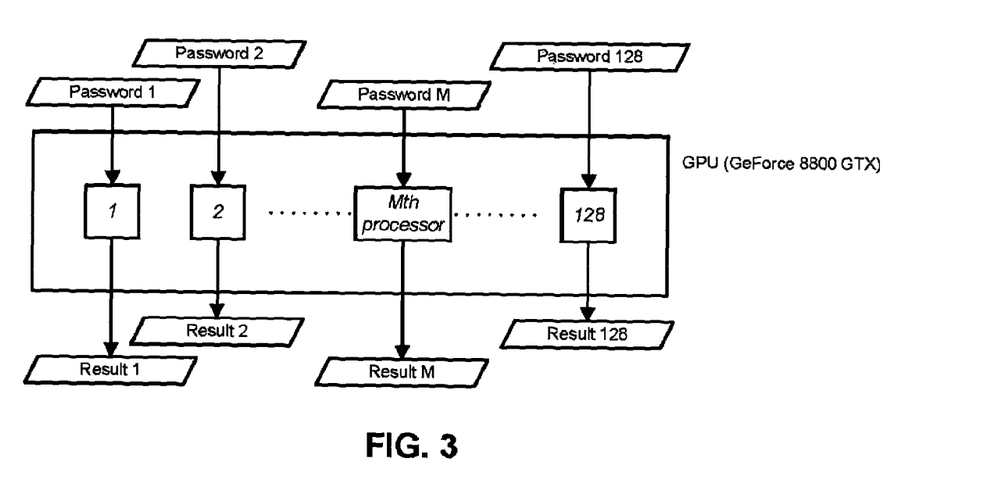
FIG. 3 illustrates using a video card GPU for brute force password verification.
Figure 4:
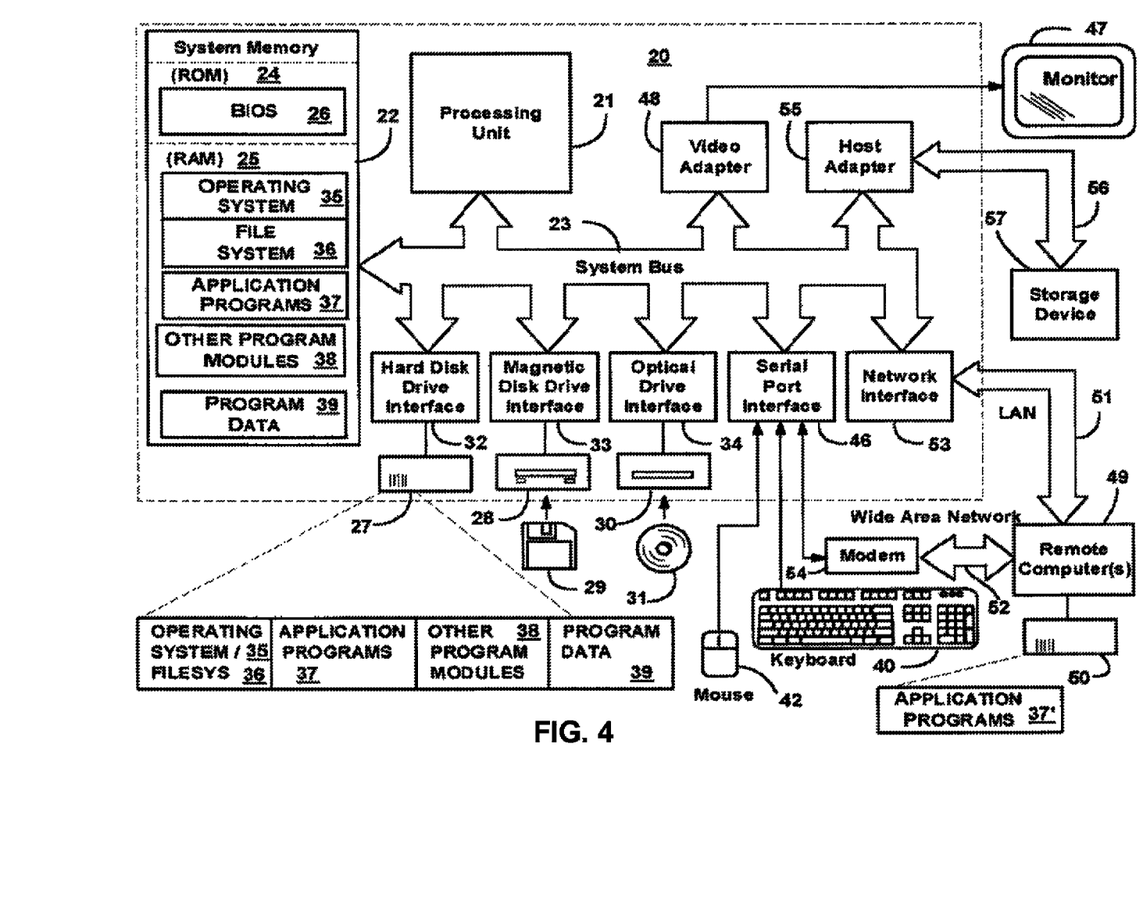
FIG. 4 illustrates a schematic of a computer system on which the invention can be implemented according to one embodiment of the invention.

With reference to FIG. 4, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. In a computer system having a central processing unit (CPU) and a graphics processing unit (GPU), a system for recovering a password used to encrypt a plaintext, the system comprising:
   (a) means for providing N passwords from the CPU to the GPU;
   (b) for each of the N passwords, means for calculating a digest from the password on the GPU, wherein the calculating is performed in parallel for at least some of the N passwords;
   (c) at the CPU, means for testing the N digests for correctness; and
   (d) if none of the N digests are correct, means for repeating steps (a)-(c) for the next set of N passwords;
   (e) means for informing the user of a correct password.

2. The system of claim 1, wherein the digests are generated by any of:
   MD4;
   MD5;
   RIPEMD;
   SHA-1;
   SHA-256;
   RC5;
   RC6,
   RC4;
   DES;
   PBKDF2;
   SHA-2; and
   a modified hash algorithm based on any of MD4, MD5, RIPEMD, SHA-1, SHA-256, RC5, RC6, RC4, DES, SHA-2.

3. The system of claim 1, wherein the system comprises multiple GPUs, with each GPU being provided with its own set of N passwords for calculation of the digests.

4. The system of claim 1, wherein the system comprises a CPU with multiple cores, each core performing the testing on a subset of the digests.

5. The system of claim 1, wherein the system comprises multiple GPUs distributed and accessible over a network, with each GPU being provided with its own set of N passwords for calculation of the digests.

6. The system of claim 1, wherein the CPU generates the N passwords based on a wordlist.

7. The system of claim 1, wherein the CPU generates the N passwords based on a Mask algorithm.

8. The system of claim 1, wherein the CPU generates the N passwords based on a dictionary.

9. The system of claim 1, wherein the CPU generates the N passwords based on a sequential brute force generation.

10. In a computer system having a central processing unit (CPU) and an external multi-core processor, a system for recovering a password used to encrypt a plaintext, the system comprising:
    (a) on the external multi-core processor, means for generating N passwords from an initial password;
    (b) for each of the N passwords, means for calculating a digest from the password on the external multi-core processor, wherein the calculating is performed in parallel for at least some of the N passwords;
    (c) at the CPU, means for testing the N digests for correctness;
    (d) if none of the N digests are correct, means for repeating steps (a)-(c) for the next set of N passwords; and
    (e) means for informing the user of a correct password.

11. The system of claim 10, wherein the external multi-core processor is a graphics processing unit.

12. In a computer system having a central processing unit (CPU) and an external multi-core processor, a system for recovering a password used to encrypt a plaintext, the system comprising:
    (a) based on an initial password, means for generating N passwords on the external multi-core processor;
    (b) for each of the N generated passwords, means for calculating a digest from the password on the external multi-core processor, wherein the calculating is performed in parallel for at least some of the N generated passwords;
    (c) at the external multi-core processor, means for testing the N digests for correctness;
    (d) if none of the N digests are correct, means for repeating steps (a)-(c) for the next set of N passwords, until the correct password is found;
    (e) means for providing the correct password to the CPU; and
    (f) means for informing the user of a correct password.

13. In a computer system having a central processing unit (CPU) and a graphics processing unit (GPU), a method for recovering a password used to encrypt a plaintext, the system comprising:
   (a) based on an initial password, generating N passwords on the GPU;
   (b) for each of the N generated passwords, calculating a digest from the password on the GPU, wherein the calculating is performed in parallel for at least some of the N generated passwords;
   (c) at the GPU, testing the N digests for correctness;
   (d) if none of the N digests are correct, repeating steps (a)-(c) for the next set of N passwords, until the correct password is found;
   (e) providing the correct password to the CPU; and
   (f) informing the user of a correct password.

14. A computer program product comprising a non-transitory storage medium containing computer code for performing the steps of claim 13.

15. In a computer system having a central processing unit (CPU) and a graphics processing unit (GPU), a method for recovering a password used to encrypt a plaintext, the system comprising:
   (a) providing N passwords from the CPU to the GPU;
   (b) for each of the N passwords, calculating a digest from the password on the GPU, wherein the calculating is performed in parallel for at least some of the N passwords;
   (c) at the CPU, testing the N digests for correctness; and
   (d) if none of the N digests are correct, repeating steps (a)-(c) for the next set of N passwords;
   (e) informing the user of a correct password.

16. A computer program product comprising a non-transitory storage medium containing computer code for performing the steps of claim 15.

* * * * *